(12) United States Patent
Pan

(10) Patent No.: US 12,195,065 B2
(45) Date of Patent: Jan. 14, 2025

(54) METHOD AND DEVICE FOR DYNAMICALLY ADJUSTING TRAIN INTERVAL BASED ON WIDE-AREA INTERLOCKING CONTROL, AND STORAGE MEDIUM

(71) Applicant: Tongji University, Shanghai (CN)

(72) Inventor: Deng Pan, Shanghai (CN)

(73) Assignee: Tongji University, Shanghai (CN)

( * ) Notice: Subject to any disclaimer, the term of this patent is extended or adjusted under 35 U.S.C. 154(b) by 49 days.

(21) Appl. No.: 18/324,291

(22) Filed: May 26, 2023

(65) Prior Publication Data
US 2023/0303139 A1 Sep. 28, 2023

(51) Int. Cl.
| B61L 25/02 | (2006.01) |
| B60M 3/04 | (2006.01) |
| B61L 27/04 | (2006.01) |
| B61L 27/16 | (2022.01) |
| B61L 27/40 | (2022.01) |

(52) U.S. Cl.
CPC .............. B61L 27/16 (2022.01); B60M 3/04 (2013.01); B61L 25/02 (2013.01); B61L 27/04 (2013.01); B61L 27/40 (2022.01)

(58) Field of Classification Search
CPC .......... B61L 27/16; B61L 27/40; B61L 27/04; B60M 3/04
See application file for complete search history.

(56) References Cited

FOREIGN PATENT DOCUMENTS

| CN | 102951189 A | 3/2013 |
| CN | 102955884 A | 3/2013 |
| CN | 103101559 A | 5/2013 |
| CN | 103886127 A | 6/2014 |
| CN | 110979401 A | 4/2020 |
| CN | 112298287 A | 2/2021 |
| CN | 113353122 A | 9/2021 |
| JP | 2019059374 A | 4/2019 |

OTHER PUBLICATIONS

Deng Pan et al., "Dynamic Control of High-Speed Train Following Operation", Promet—Traffic&Transportation, vol. 26, 2014, No. 4, pp. 291-297.
Deng Pan et al., "Dynamic control of train interval based on real-time calibration of safe headway", Journal of Traffic and Transportation Engineering, vol. 14, 2014, No. 1, pp. 112-118.

*Primary Examiner* — Gonzalo Laguarda

(57) ABSTRACT

A method and device for dynamically adjusting train interval based on wide-area interlocking control, and a computer-readable storage medium. The method includes: (1) dynamically managing trains; (2) identifying a following relationship; if there is a following relationship, performing step (3), otherwise, controlling the train using existing control technology; (3) identifying weather; if the thunderstorm weather occurs, performing step (4); otherwise, adjusting the train interval by existing control technology; (4) acquiring operation states of a wireless communication system, traction power grid, traction drive system and train control system in real time; if the operation conditions are normal, performing step (5), otherwise, performing step (6); (5) independently analyzing the safety of actual following distance by the preceding and following trains in real time; performing interlocking control according to analysis results; and (6) activating a fail-safe interlocking control module to ensure dynamic and safe control of the train interval.

9 Claims, 3 Drawing Sheets

METHOD AND DEVICE FOR DYNAMICALLY ADJUSTING TRAIN INTERVAL BASED ON WIDE-AREA INTERLOCKING CONTROL, AND STORAGE MEDIUM

CROSS-REFERENCE TO RELATED APPLICATIONS

This application claims the benefit of priority from Chinese Patent Application No. 202210615957.1, filed on May 31, 2022. The content of the aforementioned application, including any intervening amendments thereto, is incorporated herein by reference in its entirety.

TECHNICAL FIELD

This application relates to train-following control in a traffic system, and more particularly to a method and device for dynamically adjusting train interval based on wide-area interlocking control, and a computer-readable storage medium.

BACKGROUND

The track circuit has the defects of "fixed length" and "low train-positioning accuracy", which are adverse to the accurate control of dynamic train interval (i.e., the actual following distance between two adjacent trains travelling in the same direction along the same route), thereby seriously restricting the improvement of traffic efficiency. The advanced train operation control (abbreviated as "train control") system proposed in the field of high-speed railway, intercity railway and urban rail transit generally adopts an accurate train positioning technique to dynamically control the train interval. On this basis, the train control technologies such as moving block system and virtual block system are developed, which are more complex, advanced and efficient in comparison with the fixed block system in the traditional track circuit-based train control technology. Moreover, the moving block system and virtual block system put forward more stringent requirements for the safety of train interval dynamic control, and are technically more difficult than the fixed block system adopting track circuit sections for the train interval control. Additionally, in complex transportation environments such as thunderstorm weather, the train interval dynamic control will become even more difficult. The equipment fault and incorrect signal display caused by lightning strikes can directly or indirectly lead to train rear-end collisions, resulting in significant loss of life and property. In this case, considerable attention has been paid to how to improve the safety of the train interval dynamic control based on accurate positioning.

Interlocking control technology is mainly employed in the railway station signal system and fixed block system. Generally, based on the logic state of ground signal equipment such as railroad switches, track circuits and signals, an interlocking logic control circuit in compliance with "fail-safe" principle is constructed to ensure the safety of railway operations. The key of real-time, continuous and accurate adjustment of dynamic train interval is to get rid of the constraint brought by "track circuit" through establishing the train interval dynamic control based on the accurate train positioning technology. However, the elimination of track circuit will essentially change the interlocking control logic among the railway switches, track circuits and signals, and thus the traditional interlocking control cannot be directly used. For safety purpose, the high-speed railways in Europe, Japan and China generally adopt the quasi-moving block system as a transitional solution, where the point-based train precise positioning technology is mostly employed while retaining the sectional track circuits, such that the safety of the railway operations is enhanced. In the point-based train precise positioning technology, the Balises or cable induction loops are discretely installed on the trackside or along the line, enabling accurate train localization only when trains pass by. However, they are unable to provide precise, real-time positioning of the trains throughout the entire operation process. Besides, the retention of the track circuits makes it less urgent for the actual application of the continuous, real-time, and accurate train positioning technology that combines Global Positioning System (GPS), wireless communication, and inertial navigation. This impedes the development of train control technologies based on the integration of precise positioning technology. In view of this, it is required to design and develop an interlocking control technology without the track circuit.

SUMMARY

An objective of this application is to provide a method and device for dynamically adjusting train interval based on wide-area interlocking control, and a computer-readable storage medium, which enables the elimination of track circuits in the interlocking control technology, and ensures safe and efficient train-following operations, particularly in thunderstorm conditions.

Technical solutions of this application are described as follows.

In a first aspect, this application provides a method for dynamically adjusting train interval based on wide-area interlocking control, comprising:
(1) performing dynamic convoy management on information of trains that travel in the same direction along the same route between adjacent railway stations by using a queue or a linked list, wherein the dynamic convoy management includes numbering the trains in an order in which the trains enter the dynamic convoy management, managing following relationships between adjacent trains, and describing the information of the trains by using object-oriented programming technology (OOPT);
(2) identifying a following relationship in real time and a role in real time to be undertaken by each of the trains in the dynamic convoy management;
for a train among the trains in the dynamic convoy management, if there is no following relationship, performing behavior control of the train by using existing train control technologies, including train control technology based on an authorized target distance and speed curve, train safety protection control technology based on a service braking curve and emergency braking curve, as well as train overspeed and temporary speed limit control technology; otherwise, identifying a following relationship and a role of the train; and performing step (3);
wherein if in the following relationship, a position and behavior of the train constitute a constraint condition on optimizing the behavior control of an adjacent following train, the following relationship is defined as following relationship 1, and the train assumes a role of a preceding train in the following relationship 1; and
if in the following relationship, optimization of behavior control of the train is constrained by a position and behavior of an adjacent preceding train, the following relationship is defined as following relationship 2, and the train assumes a role of a following train in the following relationship 2;

(3) acquiring weather information and judging whether a thunderstorm occurs; if the thunderstorm occurs, performing step (4), otherwise, adjusting the train interval by using the existing train control technologies;

(4) acquiring operational states of a wireless communication system, a traction power grid, a train traction drive system and a train control system in real time; if the wireless communication system, the traction power grid, the train traction drive system and the train control system are all in a normal operation state, performing step (5); otherwise, performing step (6);

(5) analyzing, respectively by two adjacent trains in the train convoy management, the following safety in real time through comparing an actual following distance between the two adjacent trains with a required dynamic safe following distance that should be maintained between the two adjacent trains at a current moment; based on analysis results, performing, respectively by the two adjacent trains in the train convoy management, an interlocking control to determine whether the traction power grid should supply power to a following train; and dynamically adjusting the train interval by implementing the interlocking control in combination with the existing train control technologies;

the step of "based on analysis results, performing, respectively by the two adjacent trains in the train convoy management, an interlocking control to determine whether the traction power grid should supply power to a following train; and dynamically adjusting the train interval by implementing the interlocking control in combination with the existing train control technologies" comprises:

(5-1) identifying a current state of a train-following system respectively by the two adjacent trains in the train-following system; if the train-following system is in State 1, performing step (5-2); and if the train-following system is in State 2, performing step (5-3);

wherein State 1 is a safe following operation state; and under State 1, the actual following distance is greater than the required dynamic safe following distance, allowing the following train to obtain power from the traction power grid; and State 2 is a following operation state with safety risk of rear-end collision; and under State 2, the actual following distance is less than or equal to the required dynamic safe following distance, resulting in that the power supply from the traction power grid to the following train is cut off;

(5-2) obtaining, by each of the trains in the train convoy management, its own following relationship in real time;

according to the following relationship, determining in real time the role that should be undertaken by each of the trains in the train convoy management;

if a train of the trains in the train convoy management only has the following relationship 1, immediately performing, by the train, a preceding train control scheme p1;

if a train of the trains in the train convoy management only has the following relationship 2, immediately performing, by the train, a following train control scheme f1;

if a train of the trains in the train convoy management has the following relationship 1 and the following relationship 2, immediately and concurrently performing, by the train, the preceding train control scheme p1 and the following train control scheme f1 to enable coordination of different roles of the train in different following relationships;

returning to step (1);

(5-3) obtaining, by each of the trains in the train convoy management, its own following relationship;

according to the following relationship, determining in real time the role that should be undertaken by each of the trains in the train convoy management;

if a train of the trains in the train convoy management only has the following relationship 1, immediately performing, by the train, a preceding train control scheme p2;

if a train of the trains in the train convoy management only has the following relationship 2, immediately performing, by the train, a following train control scheme f2;

if a train of the trains in the train convoy management has the following relationship 1 and the following relationship 2, immediately and concurrently performing, by the train, the preceding train control scheme p2 and the following train control scheme f2 to enable coordination of different roles of the train in different following relationships; and returning to step (1);

wherein the preceding train control scheme p1 is performed through steps of:

(p1-1) determining, by a preceding train, whether the preceding train is capable of obtaining power from the traction power grid;

if the preceding train fails to obtain the power from the traction power grid, cutting off power supply from the traction power grid to a following train or maintaining a power-off state of the following train; if the preceding train has obtained the power supply from the traction power grid, performing step (p1-2);

(p1-2) analyzing, by the preceding train, a safety of actual following distance from the following train to obtain a safety analysis result in real time;

if the safety analysis result shows that an actual following distance is less than or equal to the required dynamic safe following distance, cutting off, by the preceding train, the power supply from the traction power grid to the following train; and simultaneously communicating its intention of power-off control to the following train; and if the safety analysis result shows that the actual following distance is greater than the required dynamic safe following distance, performing step (p1-3);

(p1-3) inquiring about or receiving information of the following train in real time; and judging whether the safety analysis result of actual following distance obtained by the following train is consistent with a safety analysis result of actual following distance obtained by the preceding train;

if the safety analysis result of actual following distance obtained by the following train is consistent with the safety analysis result of actual following distance obtained by the preceding train, continuously supplying power from the traction power grid to the following train under a control of the preceding train;

if the preceding train fails to perform consistency judgement for the safety analysis result of actual following distance obtained by the following train and the safety analysis result of actual following distance obtained by the preceding train within a preset period, or three consecutive judgements all demonstrate that the safety analysis result of actual following distance obtained by the following train is inconsistent with the safety analysis result of actual following distance obtained by the preceding train, cutting off, by the preceding train, the power supply from the traction power grid to the following train, and simultaneously communicating its intention of power-off control to the following train;

the following train control scheme f1 is performed through steps of:

(f1-1) analyzing, by a following train, a safety of actual following distance from the preceding train to obtain a safety analysis result in real time;

if the safety analysis result shows that an actual following distance is less than or equal to the required dynamic safe following distance, performing step (f1-2);

if the safety analysis result shows that the actual following distance is greater than the required dynamic safe following distance, performing step (f1-3);

(f1-2) decelerating the following train, by the following train itself, through coasting or braking to avoid a rear-end collision with the preceding train, and simultaneously communicating its intention of deceleration control to the preceding train;

wherein deceleration of the following train consists of the following two schemes:

in a first scheme, a power supply from the traction power grid to the following train is not cut off, and the following train decelerates through coasting or braking in the presence of power supply to avoid a rear-end collision with the preceding train; and in a second scheme, the power supply from the traction power grid to the following train is cut off, and the following train decelerates through coasting or regenerative braking, or by using an energy stored in the following train itself to avoid a rear-end collision with the preceding train;

wherein the following train first chooses the first scheme for behavior control; and if the first scheme fails, the second scheme is performed for the behavior control of the following train;

(f1-3) adopting, by the following train, an autonomous control mode to perform a following operation; and simultaneously detecting whether the preceding train cuts off a power supply from the traction power grid to the following train in real time;

if the following train detects in real time that the preceding train has successfully cut off the power supply from the traction power grid to the following train, or receives an intention of the preceding train to cut off the power supply from the traction power grid to the following train, cutting off, by the following train, the power supply from the traction power grid to itself, so as to ensure that the following train is in a power-off state or a reliable power-off state; simultaneously decelerating the following train through coasting or regenerative braking, or by using the energy stored in the following train to avoid a rear-end collision with the preceding train;

the following train control scheme f2 is performed through steps of:

(f2-1) analyzing, by a following train, a safety of actual following distance from the preceding train to obtain a safety analysis result in real time;

if the safety analysis result of actual following distance obtained by the following train shows that an actual following distance is greater than the required dynamic safe following distance, requesting, by the following train, the preceding train to restore the power supply from the traction power grid to the following train; otherwise, performing step (f2-2);

(f2-2) if the preceding train accepts the request of the following train for restoring the power supply from the traction power grid to the following train itself, performing step (f2-3); if the preceding train rejects the request of the following train for restoring the power supply from the traction power grid to the following train itself, or the preceding train fails to respond to the request of the following train for restoring the power supply from the traction power grid to the following train itself within a preset period, maintaining the following train in a current power-off state and waiting for a new instruction from the preceding train or a railway station; and (f2-3) checking whether the preceding train has restored the power supply from the traction power grid to the following train; if yes, immediately restoring, by the following train, its own power supply connection with the traction power grid, and controlling, by the following train, its own following behavior according to a normal following situation; if no, maintaining, by the following train, in its own current power-off state;

the preceding train control scheme p2 is performed through steps of:

(p2-1) determining, by a preceding train, whether the preceding train is capable of obtaining power from the traction power grid;

if the preceding train fails to obtain the power supply from the traction power grid, cutting off a power supply from the traction power grid to a following train or maintaining a power-off state of the following train; prohibiting a tentative agreement or an agreement to a request for restoring the power supply from the traction power grid to the following train; and if the preceding train has obtained the power supply from the traction power grid, performing step (p2-2)

(p2-2) analyzing, by the preceding train, a safety of actual following distance from the following train in real time to obtain a safety analysis result in real time;

if the safety analysis result of actual following distance obtained by the preceding train shows that an actual following distance is less than or equal to the required dynamic safe following distance, rejecting the request of the following train for restoring the power supply from the traction power grid to the following train itself; and communicating a rejection of the request to the following train;

if the safety analysis result of actual following distance obtained by the preceding train shows that the actual following distance is greater than the required dynamic safe following distance, tentatively agreeing the request of the following train for restoring the power supply from the traction power grid to the following train itself and submitting a tentative agreement to a railway station or a dispatching control center; if the request of the following train for restoring the power supply from the traction power grid to the following train itself is approved, communicating, by the preceding train, a message to the following train, confirming an immediate effectiveness of the tentative agreement, and promptly restoring, by the following train, the power supply from the traction power grid to itself when the following train receives the confirmation of the tentative agreement going into effect from the preceding train; and if the request of the following train for restoring the power supply from the traction power grid to itself is not approved, cancelling the tentative agreement and rejecting the request of the following train for restoring the power supply from the traction power grid to the following train itself, and communicating a rejection of the request to the following train; and (6) activating a fail-safe interlocking control module in real time; according to the following relationships and roles of adjacent two trains in the train convoy management, performing a fail-safe interlocking power-off mechanism by the fail-safe interlocking control module through a concurrent cooperation of the preceding train and the following train; wherein the fail-safe interlocking power-off mechanism is performed through steps of:

(6-1) obtaining, by each of the trains in the train convoy management, its own following relationship;

(6-2) according to the following relationship in real time of each of the trains in the train convoy management, determining the roles of the adjacent two trains in real time;

if a train of the trains in the train convoy management only has the following relationship 1, immediately performing, by the train, a preceding train control scheme p3;

if a train of the trains in the train convoy management only has the following relationship 2, immediately performing, by the train, a following train control scheme f3; and if a train of the trains in the train convoy management has the following relationship 1 and the following relationship 2, concurrently and immediately performing, by the train, the preceding train control scheme p3 and the following train control scheme f3 to enable coordination of different roles of the train in different following relationships; and (6-3) returning to step (1);

wherein the preceding train control scheme p3 is performed through steps of:

(p3-1) judging a fault; if the fault is neither caused by a preceding train nor a following train, performing step (p3-2); if the fault is caused by the preceding train, performing step (p3-3);

(p3-2) cutting off, by the preceding train, a power supply from the traction power grid to the preceding train itself, and decelerating the preceding train itself by coasting or regenerative braking, or by using an energy stored in the preceding train according to an actual situation to avoid a rear-end collision with the train ahead of it; simultaneously cutting off, by the preceding train, a power supply from the traction power grid to the following train; and communicating its intention of power-off control to the following train;

(p3-3) cutting off, by the following train, the power supply from the traction power grid to the following train itself; and according to actual situations, immediately decelerating the following train itself through coasting or regenerative braking, or by using an energy stored in the following train itself to avoid rear-end collisions with the preceding train; simultaneously cutting off, by the following train, the power supply from the traction power grid to an adjacent train behind it; and communicating its intention of power-off control by the following train to the adjacent train behind it;

(p3-4) receiving, by the preceding train, information transmitted by the following train; if the preceding train fails to receive the information transmitted by the following train within a preset period, or the information received by the preceding train indicates an intention of the following train to cut off its own power supply from the traction power grid, checking, by the preceding train, whether the preceding train has indeed cut off the power supply from the traction power grid to the following train; if the power supply from the traction power grid to the following train has not been successfully cut off, immediately making, by the preceding train, another attempt to cut off the power supply from the traction power grid to the following train again to ensure reliable power disconnection for the following train.

the following train control scheme f3 is performed through steps of:

(f3-1) judging a fault; if the fault is neither caused by a preceding train nor a following train, performing step (f3-2); and if the fault is caused by the following train, performing step (f3-3);

(f3-2) cutting off, by the following train, a power supply from the traction power grid to the following train itself; simultaneously, cutting off, by the following train, a power supply from the traction power grid to the preceding train, and communicating its intention of power-off control to the preceding train;

(f3-3) cutting off, by the following train, a power supply from the traction power grid to the following train itself, and simultaneously communicating its intention of power-off control to the preceding train;

(f3-4) receiving, by the following train, information transmitted by the preceding train; if the following train fails to receive the information transmitted by the preceding train within a preset period, or the information received by the following train indicates an intention of the preceding train to cut off the power supply from the traction power grid to the following train, regardless of whether the preceding train has successfully cut off the power supply from the traction power grid to the following train, cutting off, by the following train, the power supply from the traction power grid to the following train itself to ensure a reliable power-off state of the following train; and decelerating the following train through coasting or regenerative braking, or by using an energy stored in the following train to avoid a rear-end collision with the preceding train; if the preceding train is required to cut off its own power supply from the traction power grid but fails, controlling, by the following train, an interlocking switch inside the preceding train to cut off the power supply from the traction power grid to the preceding train.

In an embodiment, the objects of train information class corresponding to the actual trains can be inserted into or deleted from the queue or linked list during the dynamic convoy management of train information. In step (1), the step of "performing dynamic convoy management on information of trains that travel in the same direction along the same route between adjacent railway stations by using a queue or a linked list" comprises: establishing, deleting and changing the following relationships between two adjacent trains;

wherein the establishment, deletion, and change of the following relationships between trains are managed through cooperation of the adjacent railway stations; the step of "establishing the following relationship" comprises: inserting an object of train information class corresponding to an actual train entering the train convoy management into a queue or a linked list, by a departure station, to record a newly-established following relationship; and informing relevant trains of the newly-established following relationship in real time;

the step of "deleting and changing the following relationship" comprises: deleting, by an arrival station, an object of train information class corresponding to an actual train in the train convoy management from the queue or the linked list when the actual train enters the arrival station, and simultaneously changing the following relationship between the actual train and the adjacent train behind it;

allowing two adjacent two trains in the train convoy management to establish or cancel communication link under the cooperative help of the departure station and the arrival station;

performing an interlocking control of dynamic train interval according to the real-time following relationship recorded in the queue or the linked list by the adjacent railway stations; wherein the adjacent railway stations are two railway stations on the same route in the same direction of train travel and having one of the following two attributes:

attribute 1: the two railway stations, as a whole, possess a functionality of dynamically managing the information of the trains, and are responsible for reflecting establishment, deletion, and change of the following relationship in real time based on actual situations in the dynamic convoy management of the information of the trains using the queue or linked list;

attribute 2: there is no other railway station between the two railway stations, or there is one or more intermediate railway stations between the two railway stations, but the intermediate railway station is not required to re-establish, delete and change the following relationship, and only acts as, if necessary, relay station for information transmission and is responsible for transmitting information about establishment, deletion, and change of the following relationship to the relevant trains in real time;

the train information is described using object-oriented programming technology (OOPT); the train information class includes attributes such as train number, serial number used in the dynamic convoy management of train information between the adjacent railway stations, the following relationship 1, the following relationship 2, a forward pointer, a backward pointer, soft switch 1, soft switch 2, soft switch 3, train performance parameters, train behavior parameters, and functions for description and control of train behavior.

In an embodiment, the interlocking control in step (5) and the fail-safe interlocking power-off mechanism in step (6) are implemented by using a switching logic control circuit in the interlocking control module; and the preceding and following trains are capable of identifying the state of the switches in the switching logic control circuit.

In an embodiment, the switching logic control circuit inside train i comprises:
a switch $S_{i-1}$;
a switch $S_i$; and
an interlocking switch $\tilde{S}_{i+1}$;
wherein the switch $S_{i-1}$, the switch $S_i$ and the interlocking switch $\tilde{S}_{i+1}$ are arranged inside train i; the switch $S_{i-1}$ is configured to be controlled by train i−1; the switch $S_i$ is configured to be controlled by train i itself; and the interlocking switch $\tilde{S}_{i+1}$ is configured to be controlled by train i+1; the switch $S_{i-1}$, the switch $S_i$ and the interlocking switch $\tilde{S}_{i+1}$ are connected in series to control a power supply from the traction power grid to train i; wherein i represents a serial number of a train for the dynamic convoy management.

In an embodiment, each of the trains in the train convoy management is capable of disconnecting a power supply from traction power grid to itself; an interior hardware switch is controlled by each of the trains through circuit or wireless communication to determine whether the power supply connection needs to established or disconnected between the power supply grid and the train itself; other switches inside each of the trains are configured to be either hardware switches or virtual switches simulated by a software; wherein an on-off state of the virtual switches is simulated or recorded by using a soft switch parameter of a train entity object generated from the train information class, and the hardware switches or the virtual switches are remotely controlled by the train ahead of it and the train behind it through wireless data transmission or by using the traction power grid.

In an embodiment, the method further comprises: establishing in real time, canceling, or re-establishing in real time a mapping relationship between switches inside train i and train i−1, train i, and train i+1, based on the dynamic convoy management in step (1) and the real-time identification of the following relationship and the role of each of the trains in step (2); and based on train serial number, naming each of switches inside each of the trains in the train convoy management to map each switch as the controlled object of a corresponding train.

In an embodiment, the weather information, and the operational states of the wireless communication system, the traction power grid, the train traction drive system, and the train control system are acquired in real time by each of the trains in the queue or the linked list.

In an embodiment, wherein the interlocking control method of dynamic train interval under thunderstorm weather belongs to a "safety-critical" control mode in special transportation environment; based on other practical requirements or safety considerations, the method can be directly applied or slightly modified for interlocking control of dynamic adjustment of train interval in non-thunderstorm weather.

In a second aspect, this application provides a device for dynamically adjusting train interval based on wide-area interlocking control, wherein the device is configured to enable a train to act as an intelligent agent for dynamically adjusting train interval based on wide-area interlocking control, an attribute, characteristic, behavior and function of a train assuming different roles in different following relationship are described and implemented by using a Multi-Agent model;

in the Multi-Agent model, a SlaveAgent 1 assumes a role of a preceding train, and is configured to handle decision-making and control behavior of the preceding train;

a SlaveAgent 2 assumes a role of a following train, and is configured to handle decision-making and control behavior of the following train; and a MasterAgent is configured to coordinate and manage resource sharing and task scheduling between the SlaveAgent 1 and the SlaveAgent 2;

the Multi-Agent model is implemented through a software mode, a hardware mode or a software-hardware combined mode; wherein under the software mode or the software-hardware combined mode, a program code in a software is configured to be executed on an on-board computer to implement the method mentioned above.

In a third aspect, this application provides a computer-readable storage medium, wherein a computer program is stored on the computer-readable storage medium; the computer program is configured to be downloaded, installed and executed by an on-board computer when the computer-readable storage medium is connected to the on-board computer; and the method mentioned above is implemented for dynamically adjusting train interval based on wide-area interlocking control when the computer program is executed by the on-board computer.

Compared with the prior art, this application has the following beneficial effects.

(1) The wide-area interlocking control of dynamic train interval is established based on precise train positioning technology, without considering the occupied and vacant states of track circuit, thereby eliminating the limitations of track circuits such as poor positioning accuracy and fixed length. Therefore, the wide-area interlocking control of dynamic train interval has different characteristics from traditional interlocking control technology.

(2) When the trains are operating normally in thunderstorm weather, the interlocking control of dynamic train interval is established based on the independent and concurrent real-time safety analysis of the preceding and following trains. Moreover, the interlocking control is realized by division of work, cooperation, and close coordination between the preceding and following trains, as well as the control of the switching logic circuit, so as to ensure high efficiency of safe train-following operation.

(3) The fail-safe interlocking power-off mechanism is realized by division cooperation and close coordination between the preceding and following trains, as well as the control of the switching logic control circuit in the fail-safe interlocking control module, which is activated by the event of equipment failure. This mechanism significantly enhances the active safety capability of the train-following system. The proposed interlocking control method guarantees the ability of the preceding and following trains to reliably cut off the power supply from the traction power grid, and reduces or eliminates the safety risks that may be caused by the mistakes of the on-duty staff in emergency, so that the occurrence of rear-end collisions can be minimized.

(4) The method provided herein is suitable for train-following operation control in thunderstorm weather, effectively preventing and avoiding rear-end collisions. Additionally, the method provided herein adopts a more stringent train control technology based on "safety first" principle under special transportation environment, and has its own independence. Based on new practical requirements or stricter safety considerations, the method provided herein is also applicable to dynamic adjustment of train interval in non-thunderstorm weather.

DETAILED DESCRIPTION OF EMBODIMENTS

This application will be described in detail below with reference to the following embodiments and accompanying drawings. The following embodiments are illustrative of this application, and are not intended to limit this application.

Figure 1:
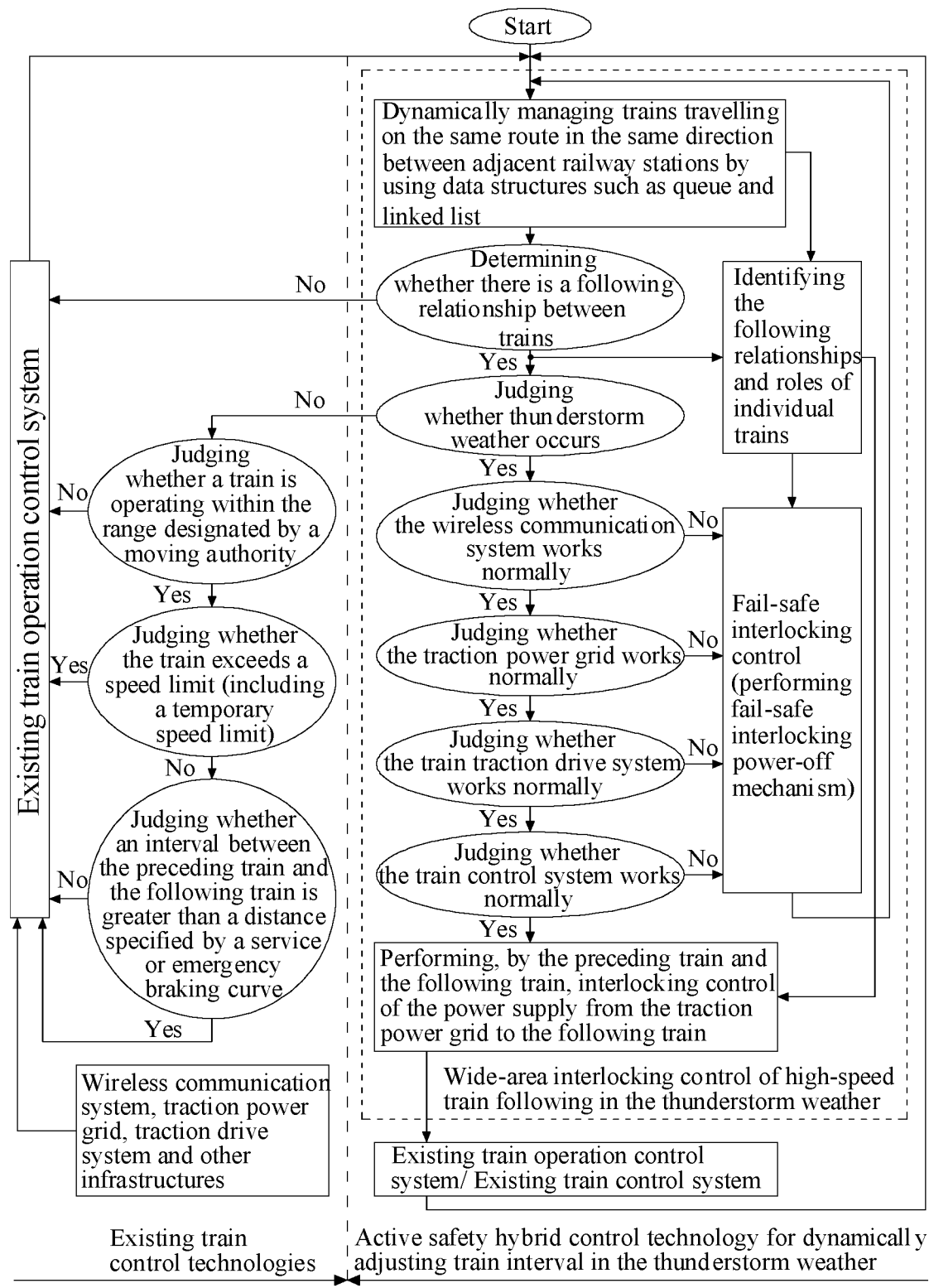
FIG. 1 is a schematic diagram of an algorithm of a system for active safety hybrid control of dynamic train interval.

Referring to an embodiment shown in FIG. 1, provided herein is a method for dynamically adjusting train interval based on wide-area interlocking control, which is performed as follows.

(1) Dynamic convoy management, including management of following relationship between adjacent trains, is performed on information of trains that travel in the same direction along the same route between adjacent railway stations collaboratively by using a queue or a linked list. Trains are numbered in in an order in which the trains enter the dynamic convoy management. The information of the trains is described by using object-oriented programming technology (OOPT).

The adjacent railway stations refer to two railway stations on the same route in the same direction of train travel and having one of the following two attributes:

attribute 1: the two railway stations, as a whole, possess a functionality of dynamically managing train information, and are responsible for reflecting the establishment, deletion, and change of the following relationship in real time based on actual situations during the dynamic convoy management of the information of the trains by using the queue or linked list; and attribute 2: there is no other railway station between the two railway stations, or there is one or more intermediate railway stations between the two railway stations, the intermediate railway station is not required to re-establish, delete and change the following relationship, and only acts as, if necessary, relay station for information transmission and is responsible for transmitting information about establishment, deletion, and change of the following relationship to the relevant trains in real time.

The train information is described by using object-oriented programming technology (OOPT). The train information class mainly includes train number, serial number used for dynamic convoy management of train information between the adjacent two railway stations, the following relationship 1, the following relationship 2, a forward pointer, a backward pointer, soft switch 1, soft switch 2, soft switch 3, train performance parameters, and train behavior parameters, and functions for description and control of train behavior.

The objects of train information class corresponding to the actual trains can be inserted into or deleted from the queue or linked list during the dynamic convoy management of train information. The following relationship between two adjacent trains is established, deleted, and changed under cooperation of the adjacent railway stations. A departure station numbers the trains with 1, 2, . . . , i, . . . , n in an order in which the trains enter the dynamic convoy management, where n is the maximum number of the trains travelling in the same direction along the same route between the adjacent railway stations. The establishment of a following relationship is recorded into a queue or linked list by the departure station, and the newly-established following relationship is sent in real time by the departure station to relevant trains. The following relationship recorded in the queue or linked list can be deleted and changed in real time by an arrival station; and sending the deletion and change of a following relationship in real time, by an arrival station, to relevant trains. The interlocking control is primarily based on the real-time following relationship recorded in the queue or linked list between the adjacent two railway stations, which perform dynamic convoy management of train information.

(2) The real-time following relationship and role to be undertaken by each of the trains in the dynamic convoy management are identified in real time. If there is no following relationship, behavior control of the train is performed by using existing train control technologies, including train control technology based on an authorized target distance and speed curve, train safety protection control technology based on a service braking curve and emergency braking curve, as well as train overspeed and temporary speed limit control technology. Otherwise, the following relationship and the role of the train are identified. Then, proceed to step (3).

When a train entity object is inserted into the queue or linked list by the departure station, a new following relationship is immediately established. When a train entity object is deleted from the queue or linked list by the arrival station, a previous relationship is modified. The objective of identifying the following relationship of a train is to clearly describe the role of the train that have the following relationship with other trains so that the train can not only fulfill the functions and duties of different roles, but also improve the level and quality of division of labor and cooperation. The importance of following relationship identification mainly includes two aspects: one is that the identification well combines the method for dynamically adjusting train interval based on wide-area interlocking control provided herein with the existing train control technologies, including train control technology based on an authorized target distance and speed curve, train safety protection control technology based on a service braking curve and emergency braking curve, as well as train overspeed and temporary speed limit control technology of the rail transit system to achieve technical compatibility, as shown in FIG. 1; another is that the identification facilitates the description and processing of decision-making and control behavior of the trains, when the trains assumes different roles.

If there is a following relationship, the train assumes the role of a preceding train, a following train, or both the preceding train and the following train.

Especially when a train assumes the roles of both "the preceding train" and "the following train", as the "following train", the train needs to deal with the problem of the dynamic control of train interval in the following relationship with the preceding train, and at the same time as the "preceding train", the train needs to deal with the problem of dynamic control of train interval in the following relationship with the following train. The control decision-making and control behavior carried out by one train with two roles exhibit the characteristics of being "real-time" and "concurrent". It is necessary to realize the overall planning, coordination, and scheduling management of the control behaviors performed by the two roles. The preceding train and the following train serve as main entities responsible for achieving the interlocking control, where the traction power grid supplies power to the following train. In the interlocking control, the general train-following situation is considered for trains traveling in the same direction along the same route between adjacent stations. In the above general situation, except for the first and last trains in the trains, other trains assume both the preceding train and the following train.

If in the following relationship, the position and behavior of the train constitute a constraint condition for optimizing the behavior control of an adjacent following train, the following relationship is defined as a following relationship 1, and the train assumes the role of a preceding train in the following relationship 1.

If in the following relationship, the behavior control optimization of the train is constrained by a position and behavior of an adjacent preceding train, the following relationship is defined as following relationship 2, and the train assumes a role of a following train in the following relationship 2.

As shown in FIG. 1, based on the identified results of the following relationships and roles of each of the trains in the train convoy management, a module where the preceding train and the following train performs interlocking control on "power supply from traction power grid to the following train" and a fail-safe interlocking control module respectively achieve their functions under their respective conditions. In this embodiment, the algorithm adopts a parallel processing approach for the "identification of the following relationship and role of each of the trains in the train convoy management" and the "judgment of thunderstorm weather and system operating state", which can improve the execution efficiency of the algorithm. On the other hand, when the computer performance permits or the algorithm efficiency can reach the control requirements, the serial processing approach can also perform the desired function or achieve the desirable control effect.

(3) Weather information is acquired and checked for thunderstorm conditions. If it is determined to be a thunderstorm, proceed to step (4). If it is not a thunderstorm, the train interval is adjusted by using the existing train control technologies of the rail transit system.

Through the judgment of the thunderstorm weather, both the preceding train and the following train can not only implement the specific technical measures, but also well combine the method provided herein and the existing train control technologies, so as to achieve the technical compatibility.

(4) Operational states of a wireless communication system, a traction power grid, a train traction drive system and a train control system are acquired in real time. If the wireless communication system, the traction power grid, the train traction drive system and the train control system are all in a normal operation state, proceed to step (5); otherwise, proceed to step (6).

The operational states of the wireless communication system, the traction power grid, the train traction drive system and the train control system are identified with the following three main considerations: 1) decomposing the complex problems facilitates their handling, reduces difficulty, and contributes to resolving complex problem more effectively; 2) treating different conditions distinctively helps enhance the targeted approach in employing technical solutions to address specific situations, thereby solving the problem better; 3) when the wireless communication system, the traction power grid, the train traction drive system and the train control system have matured in their technological applications, the probability of experiencing failures is relatively low, treating them differently based on their specific conditions helps enhance the efficiency of safe train operations under normal working conditions.

(5) In the train convoy management, the preceding train and the following train of two adjacent trains analyze the real-time following safety through comparing an actual following distance between the adjacent two trains with a required dynamic safe following distance that should be maintained between the two adjacent trains at a current moment. Through this analysis, they obtain results that reflect the level of safety in the following relationship. Based on the comparison analysis results, the preceding train and the following train in the adjacent two trains cooperate closely with each other to realize the interlocking control on the power supply from traction power grid to the following train in the adjacent two trains, and then dynamically adjust the train interval by using the existing train control technologies in combination with the interlocking control mechanism. This ensures efficient and safe coordination between the two trains in terms of power supply and train spacing management.

Figure 3:
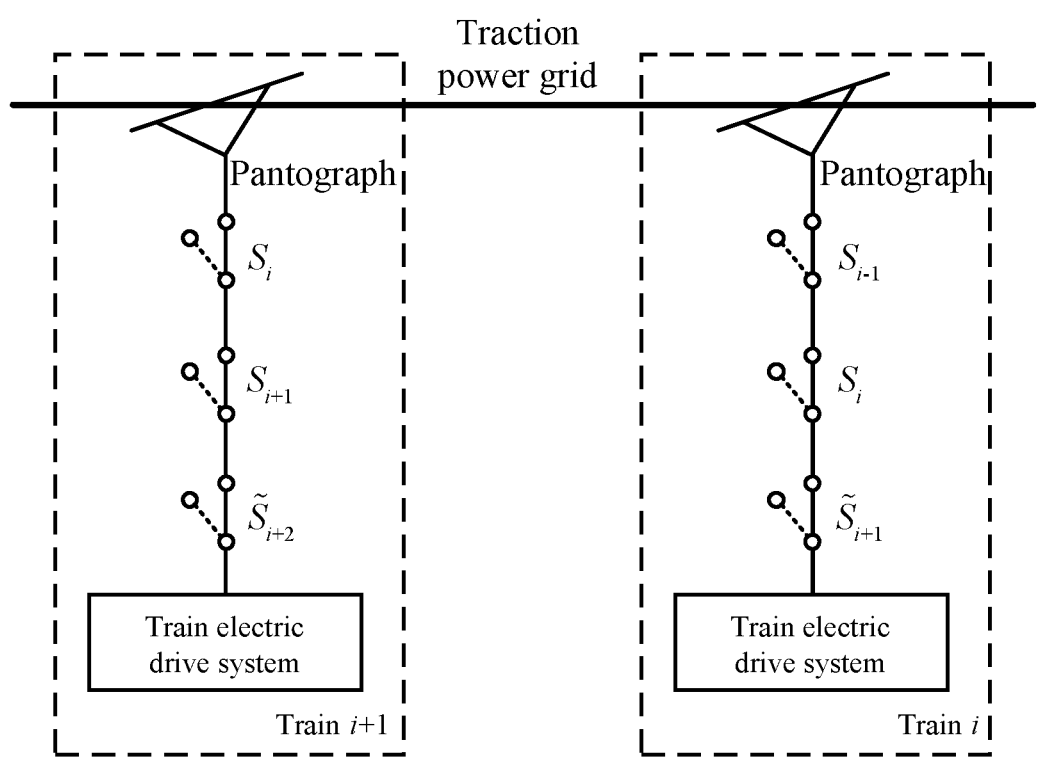
FIG. 3 is a schematic diagram of a switching logic control circuit for controlling the power supply from a traction power grid to each train according to an embodiment of this application.

FIG. 3 is a schematic diagram of a switching logic control circuit for controlling the power supply from a traction power grid to the trains under the general situation of the train-following operations. The interlocking control of the power supply from the traction power grid to the following train is realized through the coordinated control of the switching logic circuit by the preceding train and the following train.

Assuming that the maximum number of the trains that travel in the same direction along the same route between the adjacent railway stations is n, the trains are numbered with 1, 2, . . . , i, . . . , n in an order in which the trains enter the dynamic convoy management. A departure railway station, when the train leaves, numbers the train sequentially and inserts a train entity object, i.e. an object of train information class corresponding to the train, into a dynamic convoy management sequence established by a queue, a linked list or other data structures. The train entity object is deleted from a queue, a linked list or other data structures by a stop railway station when the train arrives at and stops the stop railway station. For the dynamic train management sequence of any adjacent railway stations, the sequence number of a train is one-to-one correspondence with the original number of the train itself at any time. Only when the object of a train entity is deleted from a queue, a linked list or other data structures by the stop railway station, and the maximum train number has been used, the sequence numbers of the deleted train entity objects can be can be recycled in an order from lowest to highest. $S_{i-1}$, $S_i$ and $S_{i+1}$ re switches respectively controlled by train i−1, train i and train i+1. $S_{i-1}$ is used by train i−1 to control the power supply from the traction power grid to train i, and $S_i$ is used by train i to control the power supply from the traction power grid to itself. $\tilde{S}_{i+1}$ and $\tilde{S}_{i+2}$ are interlocking switches, which are respectively used by train i+1 and train i+2 to cut off the power supply circuit of train i+1 and the train i+2, when the wireless communication system, the traction power grid, the train traction drive system, or/and the train control system fails. The above switches are arranged inside the train. Once the following relationship is established, an immediate corresponding relationship is established between the switches inside the preceding train and the following train, and the switches are named based on the sequence numbers of the preceding and following trains, determining the control subject of each switch. Any train is capable of disconnecting itself from the power supply from the traction power grid. Except for the switches that are controlled by a train to connect or disconnect itself to the traction power grid, other switches are controlled by adjacent trains located ahead or behind it. This control is achieved through wireless data transmission or by using the traction power grid for remote control.

Referring to FIG. 3, taking the train i and the train i+1 that have the following relationship between them as an example. Considering the specific operational scenario of the train-following system, the control of the power supply from the traction power grid to the following train is governed by the following principles:

a switch $S_{i-1}$, a switch $S_i$ and an interlocking switch $\tilde{S}_{i+1}$ are arranged inside the train i, and the switch $S_{i-1}$ is configured to be controlled by train i−1, a switch $S_i$ is configured to be controlled by train i itself; a switch $S_i$, a switch $S_{i+1}$ and an interlocking switch $\tilde{S}_{i+2}$ arranged inside the train i+1, and the switch $S_i$ is configured to be controlled by train i, the switch $S_{i+1}$ is configured to be controlled by train i+1 itself; the interlocking switches $\tilde{S}_{i+1}$ and $\tilde{S}_{i+2}$ are only utilized by train i+1 and train i+2 when there are failures in the wireless communication system, the traction power grid, the train traction drive system and the train control system;

the train i and the train i+1 independently and concurrently analyze the safety of actual following distance between them in real time, and closely cooperate to implement the interlocking control of the switching logic circuit;

the transmission of data and information between the train i and the train i+1 is preferably carried out by wireless communication. However, if needed, the traction power grid can serve as an alternative communication channel for data and information transmission between the train i and the train i+1;

i) the actual following distance is greater than the required dynamic safe following distance, if the actual following distance is greater than the required dynamic safe following distance, the traction power grid is controlled by the preceding train to continuously supply power to the following train; during this process, all switches in the train i and the train i+1 are switched on to ensure seamless power supply;

ii) the actual following distance is less than or equal to the required dynamic safe following distance, the train i analyzes the safety of actual following distance from train i+1 in real time; if analysis result shows that "the actual following distance is less than or equal to the required dynamic safe following distance", the switch $S_i$ inside the train i+1 is turned off, disconnecting the power supply from the traction power grid to the train i+1; then, the train i+1 turns off the switch $S_{i+1}$ (inside the train i+1), cutting off the power supply from the traction power grid to itself; the switch $S_i$ and the switch $S_{i+1}$ inside the train i+1 are turned off so that the power-off reliability of the train i+1 is greatly improved; when the power supply to the train i+1 is cut off, the train i+1 immediately decelerates through coasting or regenerative braking, or by using an energy stored in the following train itself, so as to improve the reliability of safe train following and helps prevent potential rear-end collisions;

if the analysis result obtained by the train i+1 shows that "the actual following distance is less than or equal to the required dynamic safe following distance", the train i+1 immediately turns off the switch $S_{i+1}$ (inside the train i+1), and informs the train i+2 to take necessary actions;

when the power supply from the traction power grid to the train i+1 is cut off, regardless of whether the initial initiator of the power cut is the train i or the train i+1 itself, if the train i+1 assumes the role of "preceding train", the power supply from the traction power grid to the train i+2 must be simultaneously cut off, and so on, in a cascading manner;

iii) restoring from "the actual following distance being less than or equal to the required dynamic safe following distance" to "the actual following distance being greater than the required dynamic safe following distance"

the train i+1 analyzes the safety of actual following distance from train i in real time; if an actual following distance is greater than the required dynamic safe following distance, the train i+1 requests the train i to restore the power supply from the traction power grid to itself; upon receiving the request from the train i+1 for restoring the power supply from the traction power grid, the train i immediately analyzes the safety of actual following distance from the train i+1 in real time to obtain an analysis result. If the analysis result meets the safety requirements, namely the request from the train i+1 conforms to the real-time analysis result obtained by the train i, the train i pre-approves the request of the train i+1 for restoring the power supply from the traction power grid to itself; the request of the train i+1 for restoring the power supply from the traction power grid to itself is officially approved once it is endorsed by the railway station or the control (dispatching) center; if the train i fails to obtain power supply from the traction power grid, the request of the train i+1 for restoring the power supply from the traction power grid to itself is rejected, and the switch $S_i$ (inside the train i+1) is maintained in the off state; when the train i+1 receives information that its request for restoring the power supply from the traction power grid to itself is agreed by the train i, the state of the switch $S_i$ (inside the train i+1) must be checked. Only when the switch $S_i$ (inside the train i+1) is in the on state, the switch $S_{i+1}$ is allowed to be turned on, so that the power supply can be obtained by train i+1 from the traction power grid.

Based on the implementation of the switching logic circuit, step (5) in the method for dynamically adjusting train interval based on wide-area interlocking control is specifically performed as follows.

(5-1) A current state of a train-following system is identified. If the train-following system is in State 1, proceed to step (5-2). If the train-following system is in State 2, proceed to step (5-3).

State 1 is a safe following operation state; under State 1, the actual following distance is greater than the required dynamic safe following distance, the following train is allowed to obtain a power supply from the traction power grid.

State 2 is a following operation state with the safety risk of rear-end collision; under State 2, the actual following distance is less than or equal to the required dynamic safe following distance, resulting in that the power supply from the traction power grid to the following train is cut off.

(5-2) The following relationship is obtained in real time by each of the trains in the train convoy management.

According to the following relationship, the role that should be undertaken by each of the trains is determined in real time.

If a train of the trains in the train convoy management only has the following relationship 1, a preceding train control scheme p1 is immediately performed by the train.

If a train of the trains in the train convoy management only has the following relationship 2, a following train control scheme f1 is immediately performed by the train.

If a train of the trains in the train convoy management has the following relationship 1 and the following relationship 2, the preceding train control scheme p 1 and the following train control scheme f1 are immediately performed by the train, allowing coordination of different roles in different following relationships.

Return to step (1).

The preceding train control scheme p1 is performed as follows.

(p1-1) A preceding train determines whether the preceding train itself is capable of obtaining power from the traction power grid.

If the preceding train fails to obtain the power from the traction power grid, the power supply from the traction power grid to a following train is cut off or a power-off state of the following train is maintained by the preceding train. If the preceding train has obtained the power from the traction power grid, proceed to step (p1-2);

(p1-2) The preceding train analyzes a safety of actual following distance from the following train to obtain a safety analysis result in real time.

If the safety analysis result shows that the actual following distance is less than or equal to the required dynamic safe following distance, the preceding train immediately cuts off the power supply from the traction power grid to the following train, and simultaneously communicating its intention of power-off control to the following train.

If the safety analysis result shows that the actual following distance is greater than the required dynamic safe following distance, proceed to step (p1-3).

(p1-3) Information of the following train are inquired or received in real time. Whether the safety analysis result of actual following distance obtained by the following train is consistent with the safety analysis result of actual following distance obtained by the preceding train is judged.

If the real-time safety analysis result of actual following distance obtained by the following train and the real-time safety analysis result of actual following distance obtained by the preceding train are consistent, the preceding train maintains continuous and uninterrupted power supply from the traction power grid to supply power to the following train by implementing an interlocking control.

If the preceding train fails to perform consistency judgement for the safety analysis result of actual following distance obtained by the following train and the safety analysis result of actual following distance obtained by the preceding train within a preset period, or three consecutive judgements all demonstrate that the safety analysis result of actual following distance obtained by the following train is inconsistent with the safety analysis result of actual following distance obtained by the preceding train, the preceding train immediately cuts off the power supply from the traction power grid to the following train, and simultaneously communicating its intention of power-off control to the following train.

The following train control scheme f1 is performed as follows.

(f1-1) A following train analyzes its own following safety in real time to obtain a safety analysis result.

If the safety analysis result of actual following distance obtained by the following train shows that an actual following distance is less than or equal to the required dynamic safe following distance, proceed to step (f1-2).

If the safety analysis result of actual following distance obtained by the following train shows that the actual following distance is greater than the required dynamic safe following distance, proceed to step (f1-3).

(f1-2) The following train decelerates itself through coasting or braking to avoid a rear-end collision with the preceding train, and simultaneously communicates its intention of deceleration control to a preceding train.

Deceleration of the following train consists of the following two schemes.

In a first scheme, a power supply from the traction power grid to the following train is not cut off, and the following train decelerates through coasting or braking in the presence of power supply to avoid a rear-end collision with the preceding train; and In a second scheme, the power supply from the traction power grid to the following train is cut off, and the following train decelerates through coasting or regenerative braking, or by using an energy stored in the following train itself to avoid a rear-end collision with the preceding train.

the following train first chooses the first scheme for behavior control; and if the first scheme fails, the second scheme is performed for the behavior control of the following train.

(f1-3) The following train operates in an autonomous control mode, while conducting real-time detecting of whether the preceding train has cut off a power supply from the traction power grid to the following train.

If the following train detects in real time that the preceding train has successfully cut off the power supply from the traction power grid to the following train, or receives an intention of the preceding train to cut off the power supply from the traction power grid to the following train, the following train immediately cuts off the power supply from the traction power grid to the following train, so as to ensure that the following train is in a power-off state or a reliable power-off state. Simultaneously, the following train immediately decelerates through coasting or regenerative braking, or by using an energy stored in the following train to avoid a rear-end collision with the preceding train.

(5-3) The following relationship is obtained in real time by each of the trains in the train convoy management.

According to the following relationship, the role that should be undertaken by each of the trains is determined in real time.

If a train of the trains in the train convoy management only has the following relationship 1, a preceding train control scheme p2 is immediately performed by the train.

If a train of the trains in the train convoy management only has the following relationship 2, a following train control scheme f2 is immediately performed by the train.

If a train of the trains in the train convoy management has the following relationship 1 and the following relationship 2, the preceding train control scheme p2 and the following train control scheme f2 are immediately and concurrently performed by the train, allowing coordination of different roles in different following relationships.

Return to step (1).

The following train control scheme f2 is performed as follows.

(f2-1) A following train analyzes its own following safety in real time to obtain a safety analysis result.

If the safety analysis result of actual following distance obtained by the following train shows that an actual following distance is greater than the required dynamic safe following distance, the following train requests the preceding train to restore the power supply from the traction power grid to the following train. Otherwise, proceed to step (f2-2);

(f2-2) If the preceding train accepts the request of the following train for restoring the power supply from the traction power grid to the following train itself, proceed to step (f2-3). If the preceding train rejects the request of the following train for restoring the power supply from the traction power grid to the following train itself, or the preceding train fails to respond to the request of the following train for restoring the power supply from the traction power grid to the following train itself within a preset period, the following train remains in a current power-off state and waits for a new instruction from the preceding train or a railway station.

(f2-3) Whether the preceding train has restored the power supply from the traction power grid to the following train is checked. If yes, the following train immediately restores the power supply connection with the traction power grid, and controls its own following behavior according to a normal following situation. If no, the following train maintains itself in its own current power-off state.

The preceding train control scheme p2 is performed as follows.

(p2-1) A preceding train determines whether it is capable of obtaining power from the traction power grid.

If the preceding train fails to obtain the power supply from the traction power grid to the preceding train, a power supply from the traction power grid to a following train is cut off, or the following train is maintained in a power-off state. A tentative agreement or an agreement to a request of the following train for restoring the power supply from the traction power grid to the following train itself is prohibited. If the preceding train has obtained the power supply from the traction power grid, proceed to step (p2-2).

(p2-2) The preceding train analyzes a safety of actual following distance from the following train to obtain a safety analysis result in real time.

If the safety analysis result of actual following distance obtained by the preceding train shows that the actual following distance is less than or equal to the required dynamic safe following distance, the request of the following train for restoring the power supply from the traction power grid to the following train itself is rejected, and a rejection of the request is communicated by the preceding train to the following train.

If the safety analysis result of actual following distance obtained by the preceding train shows that the actual following distance is greater than the required dynamic safe following distance, the request of the following train for restoring the power supply from the traction power grid to the following train itself is tentatively agreed, and a tentative agreement is submitted to the railway station or a dispatching control center. If the request of the following train for restoring the power supply from the traction power grid is approved, the preceding train communicates a message to the following train to confirm the immediate effectiveness of the tentative agreement. Upon receiving the confirmation of the tentative agreement going into effect from the preceding train, the following train promptly restores the power supply from the traction power grid to itself. If the request of the following train for restoring the power supply from the traction power grid to the following train itself is not approved, the following train remains in the current power-off state. If the preceding train rejects the request of the following train for restoring the power supply from the traction power grid to the following train itself, a rejection of the request is communicated by the preceding train to the following train and the following train remains in its current power-off state.

The preceding train control scheme p1 and the following train control scheme f1 are characterized in that: the preceding train and the following train are capable of cutting off the power supply from the traction power grid to themselves; the preceding train is capable of cutting off the power supply from the traction power grid to the following train; both the preceding train and the following train independently perform real-time safety analysis of train following behaviors; the control behaviors of the preceding train and the following train are executed concurrently; the preceding train and the following train cooperate closely with each other to realize the interlocking control and dynamically adjust the train interval.

The preceding train control scheme p2 and the following train control scheme f2 in step (5-3) are characterized in that: the following train needs to make a request to the preceding train for restoring the power supply from the traction power grid to itself; the request is based on the analysis and judgment on its own following safety; the preceding train accepts or reject the request of the following train for restoring the power supply from the traction power grid to itself based on its independent analysis and judgment on the safety of actual following distance; and the following train fails to restore the power supply from the traction power grid to itself without the approval by the preceding train.

(6) A fail-safe interlocking control module is activated in real time to enhance safety of train following. According to the following relationship and the role of each of the trains in the train convoy management, a fail-safe interlocking power-off mechanism is concurrently performed by the fail-safe interlocking control module through the division of labor and cooperation and close fitting of a preceding train and a following train. The fail-safe interlocking power-off mechanism is performed as follows.

(6-1) The following relationship is obtained in real time by each of the trains in the train convoy management.

(6-2) According to the following relationship, the role that should be undertaken by each of the trains is determined in real time.

If a train of the trains in the train convoy management only has the following relationship 1, a preceding train control scheme p3 is immediately performed by the train;

If a train of the trains in the train convoy management only has the following relationship 2, a following train control scheme f3 is immediately performed by the train; and If a train of the trains in the train convoy management has the following relationship 1 and the following relationship 2, the preceding train control scheme p3 and the following train control scheme f3 are immediately performed by the train, allowing coordination of different roles in different following relationships.

(6-3) Return to step (1).

The preceding train control scheme p3 is performed as follows.

(p3-1) A fault is judged. If the fault is neither caused by a preceding train nor a following train, proceed to step (p3-2). If the fault is caused by the preceding train, proceed to step (p3-3).

(p3-2) The preceding train cuts off the power supply from the traction power grid to itself, and decelerates by coasting or regenerative braking, or by using an energy stored in the following train according to actual situations to avoid a rear-end collision. Simultaneously, the power supply from the traction power grid to the following train is cut off, and a power-off intention is communicated to the following train.

(p3-3) The following train cuts off the power supply from the traction power grid to itself. According to actual situations, the following train decelerates immediately through coasting or regenerative braking, or by using an energy stored in the following train itself to avoid rear-end collisions with the preceding train. Simultaneously, the power supply from the traction power grid to the adjacent train behind it is cut off by the following train, and a power-off intention is communicated by the following train to the adjacent train behind it.

(p3-4) The preceding train receives information transmitted by the following train. If the preceding train fails to receive the information transmitted by the following train within a preset period, or the information received by the preceding train indicates an intention of the following train to cut off its own power supply connection with the traction power grid, the preceding train checks whether the preceding train itself has indeed cut off the power supply from the traction power grid to the following train. If the power supply from the traction power grid to the following train has not been successfully cut off, the preceding train will immediately make another attempt to cut off the power supply from the traction power grid to the following train again, so as to ensure that the following train is reliably disconnected from the traction power grid.

The following train control scheme f3 is performed as follows.

(f3-1) A fault is judged. If the fault is neither caused by a preceding train nor a following train, proceed to step (f3-2). If the fault is caused by the following train, proceed to step (f3-3).

(f3-2) The following train cuts off the power supply from the traction power grid to itself. Simultaneously, the power supply from the traction power grid to the preceding train is cut off by the following train, and a power-off intention is transmitted to the preceding train.

(f3-3) The following train cuts off its power supply connection with the traction power grid. Simultaneously, a power-off intention is transmitted to the preceding train.

(f3-4) The following train receives information transmitted by the preceding train. If the following train fails to receive the information transmitted by the preceding train within a preset period, or the information received by the following train indicates an intention of the preceding train to cut off the power supply from the traction power grid to the following train, regardless of whether the preceding train cuts off the power supply from the traction power grid to the following train successfully or not, the following train will immediately cut off its power supply connection with the traction power grid to ensure a reliable power-off state of the following train. Then the following train immediately decelerates through coasting or regenerative braking, or by using an energy stored in the following train to avoid a rear-end collision with the preceding train. If the preceding train is required to cut off the power supply from the traction power grid to itself but fails, the following train will control an interlocking switch inside the preceding train to cut off the power supply from the traction power grid to the preceding train.

When the fail-safe interlocking power-off mechanism is performed by the preceding and following trains through activating the interlocking control module, it is characterized in that when there are failures in the wireless communication system, the traction power grid, the train traction drive system and the train control system, the preceding train and the following train are triggered to execute the fail-safe interlocking power-off mechanism; and during the implementation of the fail-safe interlocking power-off mechanism, the preceding train and the following train operates in a cooperative division of labor, with the preceding train assuming a more dominant role in this cooperative division of labor.

Between the preceding train and following train, information is transmitted through either wireless communication or traction power grid. Compared with the single way of information transmission through wireless communication, the probability of simultaneous failure of both wireless communication and traction power grid is greatly reduced. When both of the wireless communication and the traction power grid fail to transmit the information, the preceding train and the following train will not receive information from each other within a preset period.

Figure 2:
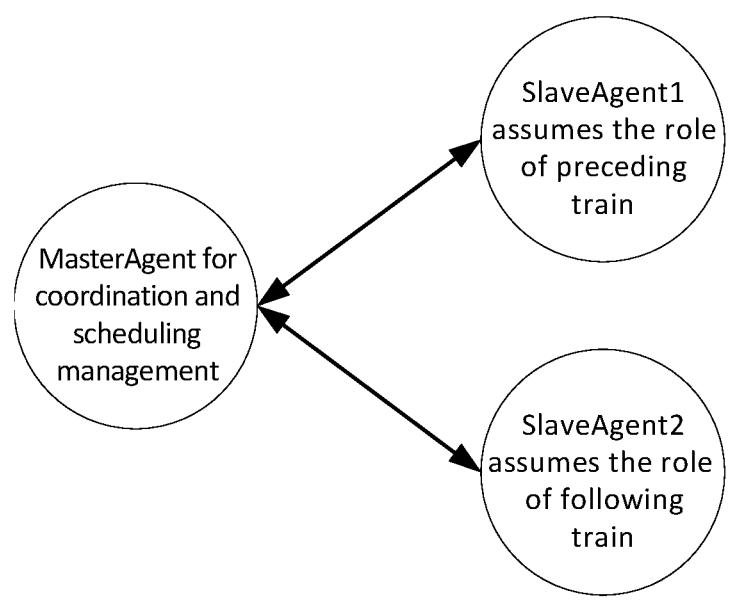
FIG. 2 schematically illustrates a Multi-Agent model used in a device for dynamically adjusting train interval based on wide-area interlocking control according to an embodiment of this application.

Provided herein is a device for dynamically adjusting train interval based on wide-area interlocking control. The device is configured to enable a train to act as an intelligent agent for dynamically adjusting train interval based on wide-area interlocking control, and an attribute, characteristic, behavior and function of the train are realized by using a Multi-Agent model. Referring to FIG. 2, based on the addition of the switching logic control circuit, any one of the three modes, a hardware mode, software mode or a software-hardware combined mode, is further adopted to realize the device. In the device, a SlaveAgent 1 assumes the role of a preceding train, a SlaveAgent 2 assumes the role of a following train, and a MasterAgent is configured to coordinate and manage resource sharing and task scheduling between the SlaveAgent 1 and the SlaveAgent 2.

If the train only assumes the role of "preceding train" in the following relationship, only the SlaveAgent 1 is generated or activated to process the decision and control behavior of the train that assumes the role of the preceding train. At the same time, if the train only assumes the role of "following train" in the following relationship, only the SlaveAgent 2 is generated or activated to process the decision and control behavior of the train that assumes the role of the following train. If the train assumes the roles of both "preceding train" and "following train" in the following relationships, the SlaveAgent 1 and the SlaveAgent 2 operate independently and concurrently to process the decisions and control behaviors of the train that assumes the roles of both "preceding train" and "following train".

If the above functions are implemented in the form of software and sold or used as an independent product, their program can be stored in a computer-readable storage medium.

When the storage medium that stores the program is properly connected to the on-board computer, regardless of the specific form of connection, the on-board computer is capable of downloading, installing and executing the program from the storage medium. When the computer program is executed, the method for dynamically adjusting train interval based on wide-area interlocking control provided herein can be implemented. Based on this understanding, part of the technical solution provided herein that essentially or rather contributes to the prior art or part of the technical solution can be embodied in the form of a software product.

The software product is stored in a storage medium. The on-board computer equipment downloads, installs and executes the program, including all or part of the steps in the method provided herein, through physical connection or various communication networks, so as to complete the interlocking control of the dynamic adjustment of train interval. The aforementioned storage medium includes a USB flash disk, a portable hard disk, a read-only memory (ROM) disk, or an optical disk and other media that can store program codes.

What is claimed is:

1. A method for dynamically adjusting train interval based on wide-area interlocking control, comprising:
   (1) performing dynamic convoy management on information of trains that travel in the same direction along the same route between adjacent railway stations by using a queue or a linked list, wherein the dynamic convoy management comprises numbering the trains in an order in which the trains enter the dynamic convoy management, managing following relationships between adjacent trains, and describing the information of the trains by using object-oriented programming technology (OOPT);
   (2) identifying a following relationship and a role to be undertaken by each of the trains in the train convoy management in real time;
   for a train among the trains in the dynamic convoy management, if there is no following relationship, performing behavior control of the train by using existing train control technologies, comprising train control technology based on an authorized target distance and speed curve, train safety protection control technology based on a service braking curve and emergency braking curve, as well as train overspeed and temporary speed limit control technology; otherwise, identifying a following relationship and a role of the train; and performing step (3);
   wherein if in the following relationship, a position and behavior of the train constitute a constraint condition on optimizing the behavior control of an adjacent following train, the following relationship is defined as following relationship 1, and the train assumes a role of a preceding train in the following relationship 1; and
   if in the following relationship, optimization of behavior control of the train is constrained by a position and behavior of an adjacent preceding train, the following relationship is defined as following relationship 2, and the train assumes a role of a following train in the following relationship 2;
   (3) acquiring weather information and judging whether a thunderstorm occurs; if the thunderstorm occurs, performing step (4); otherwise, adjusting the train interval by using the existing train control technologies, comprising train control technology based on an authorized target distance and speed curve, train safety protection control technology based on a service braking curve and emergency braking curve, as well as train overspeed and temporary speed limit control technology;
   (4) acquiring operational states of a wireless communication system, a traction power grid, a train traction drive system and a train control system in real time; if the wireless communication system, the traction power grid, the train traction drive system and the train control system are all in a normal operation state, performing step (5); otherwise, performing step (6);
   (5) analyzing, respectively by two adjacent trains in the train convoy management, the following safety in real time through comparing an actual following distance between the two adjacent trains with a required dynamic safe following distance that should be maintained by the two adjacent trains at a current moment;

based on analysis results, performing, respectively by the two adjacent trains in the train convoy management, an interlocking control to determine whether the traction power grid should supply power to a following train; and dynamically adjusting the train interval by implementing the interlocking control in combination with the existing train control technologies;

wherein the step of "based on analysis results, performing, respectively by the two adjacent trains in the train convoy management, an interlocking control to determine whether the traction power grid should supply power to a following train; and dynamically adjusting the train interval by implementing the interlocking control in combination with the existing train control technologies" comprises:

(5-1) identifying a current state of a train-following system respectively by the two adjacent trains in the train-following system; if the train-following system is in State 1, performing step (5-2); and if the train-following system is in State 2, performing step (5-3);

wherein State 1 is a safe following operation state; and under State 1, the actual following distance is greater than the required dynamic safe following distance, allowing the following train to obtain power from the traction power grid; and State 2 is a following operation state with safety risk of rear-end collision; and under State 2, the actual following distance is less than or equal to the required dynamic safe following distance, resulting in that the power supply from the traction power grid to the following train is cut off;

(5-2) obtaining, by each of the trains in the train convoy management, its own following relationship in real time;

according to the following relationship, determining in real time the role that should be undertaken by each of the trains in the train convoy management;

if a train of the trains in the train convoy management only has the following relationship 1, immediately performing, by the train, a preceding train control scheme p1;

if a train of the trains in the train convoy management only has the following relationship 2, immediately performing, by the train, a following train control scheme f1;

if a train of the trains in the train convoy management has the following relationship 1 and the following relationship 2, immediately and concurrently performing, by the train, the preceding train control scheme p1 and the following train control scheme f1 to enable coordination of different roles of the train in different following relationships; and returning to step (1);

(5-3) obtaining, by each of the trains in the train convoy management, its own following relationship;

according to the following relationship, determining the role that should be undertaken by each of the trains in the train convoy management;

if a train of the trains in the train convoy management only has the following relationship 1, immediately performing, by the train, a preceding train control scheme p2;

if a train of the trains in the train convoy management only has the following relationship 2, immediately performing, by the train, a following train control scheme f2;

if a train of the trains in the train convoy management has the following relationship 1 and the following relationship 2, immediately and concurrently performing, by the train, the preceding train control scheme p2 and the following train control scheme f2, to enable coordination of different roles of the train in different following relationships; and returning to step (1);

wherein the preceding train control scheme p1 is performed through steps of:

(p1-1) determining, by a preceding train, whether the preceding train is capable of obtaining power from the traction power grid;

if the preceding train fails to obtain the power from the traction power grid, cutting off power supply from the traction power grid to a following train or maintaining a power-off state of the following train; and if the preceding train has obtained the power from the traction power grid, performing step (p1-2);

(p1-2) analyzing, by the preceding train, a safety of actual following distance from the following train to obtain a safety analysis result in real time;

if the safety analysis result shows that an actual following distance is less than or equal to the required dynamic safe following distance, cutting off, by the preceding train, the power supply from the traction power grid to the following train, and simultaneously communicating its intention of power-off control to the following train; and if the safety analysis result shows that the actual following distance is greater than the required dynamic safe following distance, performing step (p1-3);

(p1-3) inquiring about or receiving information of the following train in real time; and judging whether the safety analysis result of actual following distance obtained by the following train is consistent with a safety analysis result of actual following distance obtained by the preceding train;

if the safety analysis result of actual following distance obtained by the following train is consistent with the safety analysis result of actual following distance obtained by the preceding train, continuously supplying power from the traction power grid to the following train under a control of the preceding train;

if the preceding train fails to perform consistency judgement for the safety analysis result of actual following distance obtained by the following train and the safety analysis result of actual following distance obtained by the preceding train within a preset period, or three consecutive judgements all demonstrate that the safety analysis result of actual following distance obtained by the following train is inconsistent with the safety analysis result of actual following distance obtained by the preceding train, cutting off, by the preceding train, the power supply from the traction power grid to the following train, and simultaneously communicating its intention of power-off control to the following train;

the following train control scheme f1 is performed through steps of:

(f1-1) analyzing, by a following train, a safety of actual following distance from the preceding train to obtain a safety analysis result in real time;

if the safety analysis result shows that an actual following distance is less than or equal to the required dynamic safe following distance, performing step (f1-2);

if the safety analysis result shows that the actual following distance is greater than the required dynamic safe following distance, performing step (f1-3);

(f1-2) decelerating the following train by itself through coasting or braking to avoid a rear-end collision with the preceding train, and simultaneously communicating its intention of deceleration control to the preceding train;

wherein deceleration of the following train consists of the following two schemes:

in a first scheme, a power supply from the traction power grid to the following train is not cut off, and the following train decelerates through coasting or braking in the presence of power supply to avoid a rear-end collision with the preceding train; and in a second scheme, the power supply from the traction power grid to the following train is cut off, and the following train decelerates through coasting or regenerative braking, or by using an energy stored in the following train itself to avoid a rear-end collision with the preceding train;

wherein the following train first chooses the first scheme for behavior control; and if the first scheme fails, the second scheme is performed for the behavior control of the following train;

(f1-3) adopting, by the following train, an autonomous control mode to perform a following operation, and simultaneously detecting whether the preceding train cuts off a power supply from the traction power grid to the following train in real time;

if the following train detects in real time that the preceding train has successfully cut off the power supply from the traction power grid to the following train, or receives an intention of the preceding train to cut off the power supply from the traction power grid to the following train, cutting off, by the following train, the power supply from the traction power grid to itself, so as to ensure that the following train is in a power-off state or a reliable power-off state; simultaneously decelerating the following train through coasting or regenerative braking, or by using the energy stored in the following train to avoid a rear-end collision with the preceding train;

the following train control scheme f2 is performed through steps of:

(f2-1) analyzing, by a following train, a safety of actual following distance from the preceding train to obtain a safety analysis result in real time;

if the safety analysis result of actual following distance obtained by the following train shows that an actual following distance is greater than the required dynamic safe following distance, requesting, by the following train, the preceding train for restoring the power supply from the traction power grid to the following train; otherwise, performing step (f2-2);

(f2-2) if the preceding train accepts the request of the following train for restoring the power supply from the traction power grid to the following train itself, performing step (f2-3); if the preceding train rejects the request of the following train for restoring the power supply from the traction power grid to the following train itself, or the preceding train fails to respond to the request of the following train for restoring the power supply from the traction power grid to the following train itself within a preset period, maintaining the following train in a current power-off state and waiting for a new instruction from the preceding train or a railway station; and (f2-3) checking whether the preceding train has restored the power supply from the traction power grid to the following train; if yes, immediately restoring, by the following train, a power supply connection with the traction power grid, and controlling, by the following train, its own following behavior according to a normal following situation; if no, maintaining, by the following train, in its own current power-off state;

the preceding train control scheme p2 is performed through steps of:

(p2-1) determining, by a preceding train, whether the preceding train is capable of obtaining power from the traction power grid;

if the preceding train fails to obtain the power supply from the traction power grid, cutting off a power supply from the traction power grid to a following train or maintaining a power-off state of the following train; prohibiting a tentative agreement or an agreement to a request for restoring the power supply from the traction power grid to the following train; and if the preceding train has obtained the power supply from the traction power grid, performing step (p2-2);

(p2-2) analyzing, by the preceding train, a safety of actual following distance from the following train in real time to obtain a safety analysis result in real time;

if the safety analysis result of actual following distance obtained by the preceding train shows that an actual following distance is less than or equal to the required dynamic safe following distance, rejecting the request of the following train for restoring the power supply from the traction power grid to the following train itself, and communicating a rejection of the request to the following train;

if the safety analysis result of actual following distance obtained by the preceding train shows that the actual following distance is greater than the required dynamic safe following distance, tentatively agreeing the request of the following train for restoring the power supply from the traction power grid to the following train itself and submitting a tentative agreement to a railway station or a dispatching control center; if the request of the following train for restoring the power supply from the traction power grid to the following train itself is approved, communicating, by the preceding train, a message to the following train confirming an immediate effectiveness of the tentative agreement, and promptly restoring, by the following train, the power supply from the traction power grid to itself when the following train receives the confirmation of the tentative agreement going into effect from the preceding train; and if the request of the following train for restoring the power supply from the traction power grid to itself is not approved, cancelling the tentative agreement and rejecting the request of the following train for restoring the power supply from the traction power grid to the following train itself, and communicating a rejection of the request to the following train; and (6) activating a fail-safe interlocking control module in real time to enhance the safety of train following; according to the following relationships and roles of adjacent two trains in the train convoy management, performing a fail-safe interlocking power-off mechanism by the fail-safe interlocking control module through a concurrent cooperation of the preceding train and the following train; wherein the fail-safe interlocking power-off mechanism is performed through steps of:
(6-1) obtaining, by each of the trains in the train convoy management, its own following relationship;
(6-2) according to the following relationship in real time of each of the trains in the train convoy management, determining the roles of the adjacent two trains in real time;
if a train of the trains in the train convoy management only has the following relationship 1, immediately performing, by the train, a preceding train control scheme p3;
if a train of the trains in the train convoy management only has the following relationship 2, immediately performing, by the train, a following train control scheme f3; and
if a train of the trains in the train convoy management has the following relationship 1 and the following relationship 2, concurrently and immediately performing, by the train, the preceding train control scheme p3 and the following train control scheme f3 to enable coordination of different roles of the train in different following relationships; and
(6-3) returning to step (1);
wherein the preceding train control scheme p3 is performed through steps of:
(p3-1) judging a fault; if the fault is neither caused by a preceding train nor a following train, performing step (p3-2); if the fault is caused by the preceding train, performing step (p3-3);
(p3-2) cutting off, by the preceding train, a power supply from the traction power grid to the preceding train itself, and decelerating the preceding train itself by coasting or regenerative braking, or by using an energy stored in the preceding train according to an actual situation to avoid a rear-end collision with the train ahead of it; simultaneously cutting off, by the preceding train, a power supply from the traction power grid to the following train; and communicating its intention of power-off control to the following train;
(p3-3) cutting off, by the following train, the power supply from the traction power grid to the following train itself; and according to actual situations, immediately decelerating the following train itself through coasting or regenerative braking, or by using an energy stored in the following train itself to avoid rear-end collisions with the preceding train; simultaneously cutting off, by the following train, the power supply from the traction power grid to an adjacent train behind it; and communicating its intention of power-off control by the following train to the adjacent train behind it;
(p3-4) receiving, by the preceding train, information transmitted by the following train; if the preceding train fails to receive the information transmitted by the following train within a preset period, or the information received by the preceding train indicates an intention of the following train to cut off its own power supply from the traction power grid, checking, by the preceding train, whether the preceding train has indeed cut off the power supply from the traction power grid to the following train; if the power supply from the traction power grid to the following train has not been successfully cut off, immediately making, by the preceding train, another attempt to cut off the power supply from the traction power grid to the following train again to ensure reliable power disconnection for the following train;
the following train control scheme f3 is performed through steps of:
(f3-1) judging a fault; if the fault is neither caused by a preceding train nor a following train, performing step (f3-2); and if the fault is caused by the following train, performing step (f3-3);
(f3-2) cutting off, by the following train, a power supply from the traction power grid to itself; simultaneously, cutting off, by the following train, a power supply from the traction power grid to the preceding train, and communicating its intention of power-off control to the preceding train;
(f3-3) cutting off, by the following train, a power supply from the traction power grid to the following train itself, and simultaneously communicating its intention of power-off control to the preceding train;
(f3-4) receiving, by the following train, information transmitted by the preceding train; if the following train fails to receive the information transmitted by the preceding train within a preset period, or the information received by the following train indicates an intention of the preceding train to cut off the power supply from the traction power grid to the following train, regardless of whether the preceding train has successfully cut off the power supply from the traction power grid to the following train, cutting off, by the following train, the power supply from the traction power grid to the following train itself to ensure a reliable power-off state of the following train; and decelerating the following train through coasting or regenerative braking, or by using an energy stored in the following train to avoid a rear-end collision with the preceding train; if the preceding train is required to cut off its own power supply from the traction power grid but fails, controlling, by the following train, an interlocking switch inside the preceding train to cut off the power supply from the traction power grid to the preceding train.

2. The method of claim 1, wherein in step (1), the step of "performing dynamic convoy management on information of trains that travel in the same direction along the same route between adjacent railway stations by using a queue or a linked list" comprises: establishing, deleting and changing the following relationship under cooperation of the adjacent railway stations;
wherein the step of "establishing the following relationship" comprises: inserting an object of train information class corresponding to an actual train entering the train convoy management into a queue or a linked list, by a departure station, to record a newly-established following relationship; and informing relevant trains of the newly-established following relationship in real time;
the step of "deleting and changing the following relationship" comprises: deleting, by an arrival station, an object of train information class corresponding to an actual train in the train convoy management from the queue or the linked list when the actual train enters the arrival station, and simultaneously changing the following relationship between the actual train and the adjacent train behind it;
allowing two adjacent two trains in the train convoy management to establish or cancel communication link under the cooperative help of the departure station and the arrival station;

performing an interlocking control of dynamic train interval according to the real-time following relationship recorded in the queue or the linked list by the adjacent railway stations; wherein the adjacent railway stations are two railway stations on the same route in the same direction of train travel and having one of the following two attributes:

attribute 1: the two railway stations, as a whole, possess a functionality of dynamically managing the information of the trains, are responsible for reflecting establishment, deletion, and change of the following relationship based on actual situations in the dynamic convoy management of the information of the trains by using the queue or linked list; and attribute 2: there is no other railway station between the two railway stations, or there is one or more intermediate railway stations between the two railway stations, but the intermediate railway station is not required to re-establish, delete and change the following relationship, and only acts as, if necessary, relay station for information transmission and is responsible for transmitting information about establishment, deletion, and change of the following relationship to the relevant trains in real time;

the train information is described using object-oriented programming technology (OOPT); the train information comprises train number, serial number used in the dynamic convoy management of train information between the adjacent railway stations, the following relationship 1, the following relationship 2, a forward pointer, a backward pointer, soft switch 1, soft switch 2, soft switch 3, train performance parameters, train behavior parameters, and functions for description and control of train behavior.

3. The method of claim 1, wherein the interlocking control in step (5) and the fail-safe interlocking power-off mechanism in step (6) are implemented by using a switching logic control circuit; and the preceding and following trains are capable of identifying the state of the switches in the switching logic control circuit.

4. The method of claim 3, wherein the switching logic control circuit inside train i comprises:
a switch $S_{i-1}$;
a switch $S_i$; and
an interlocking switch $\tilde{S}_{i+1}$;
wherein the switch $S_{i-1}$, the switch $S_i$ and the interlocking switch $\tilde{S}_{i+1}$ are arranged inside train i; the switch $S_{i-1}$ is configured to be controlled by train i−1; the switch $S_i$ is configured to be controlled by train i itself; and the interlocking switch $\tilde{S}_{i+1}$ is configured to be controlled by train i+1; the switch $S_{i-1}$, the switch $S_i$ and the interlocking switch $\tilde{S}_{i+1}$ are connected in series to control a power supply from the traction power grid to train i; wherein i represents a serial number of a train in the dynamic convoy management.

5. The method of claim 4, wherein each of the trains in the train convoy management is capable of disconnecting a power supply from traction power grid to itself; an interior hardware switch is controlled by each of the trains through circuit or wireless communication to determine whether the power supply connection needs to established or disconnected between the power supply grid and the train itself; other switches inside each of the trains in the train convoy management are configured to be either hardware switches or virtual switches simulated by a software; wherein an on-off state of the virtual switches is simulated or recorded by using a soft switch parameter of a train entity object generated from the train information class, and the hardware switches or the virtual switches are remotely controlled by the train ahead of it and the train behind it through wireless data transmission or by using the traction power grid.

6. The method of claim 4, further comprising:
establishing in real time, canceling, or re-establishing in real time a mapping relationship between switches inside train i and train i−1, train i, and train i+1, based on the dynamic convoy management in step (1) and the real-time identification of the following relationship and the role of each of the trains in step (2); and based on train serial number, naming each of switches in each of the trains in the train convoy management to map each switch as the controlled object of a corresponding train.

7. The method of claim 1, wherein the weather information, and the operational states of the wireless communication system, the traction power grid, the train traction drive system, and the train control system are acquired in real time by each of the trains in the queue or the linked list.

8. A device for dynamically adjusting train interval based on wide-area interlocking control, wherein the device is configured to enable a train to act as an intelligent agent for dynamically adjusting train interval based on wide-area interlocking control, and an attribute, characteristic, behavior and function of a train assuming different roles in different following relationship are described and implemented by using a Multi-Agent model;
in the Multi-Agent model, a SlaveAgent 1 assumes a role of a preceding train, and is configured to handle decision-making and control behavior of the preceding train;
a SlaveAgent 2 assumes a role of a following train, and is configured to handle decision-making and control behavior of the following train; and
a MasterAgent is configured to coordinate and manage resource sharing and task scheduling between the SlaveAgent 1 and the SlaveAgent 2;
the Multi-Agent model is implemented through a software mode, a hardware mode or a software-hardware combined mode; wherein under the software mode or the software-hardware combined mode, a program code in a software is configured to be executed on an on-board computer to implement the method of claim 1.

9. A computer-readable storage medium, wherein a computer program is stored on the computer-readable storage medium; the computer program is configured to be downloaded, installed and executed by an on-board computer to implement the method of claim 1 when the computer-readable storage medium is connected to the on-board computer.

* * * * *